United States Patent [19]
Gill et al.

[11] Patent Number: 5,569,425
[45] Date of Patent: Oct. 29, 1996

[54] METHOD AND APPARATUS FOR MAKING FIBER-FILLED CUSHION

[75] Inventors: Prem P. Gill, Rochester Hills; Paul W. Chrenka, Shelby Township; David W. Whitehead, Rochester Hills, all of Mich.

[73] Assignee: General Motors Corporation, Detroit, Mich.

[21] Appl. No.: 573,772

[22] Filed: Dec. 18, 1995

[51] Int. Cl.$^6$ ........................................... B29C 35/04
[52] U.S. Cl. .................. 264/121; 264/122; 425/80.1; 425/414; 425/416; 425/420
[58] Field of Search .................... 264/517, 113, 264/121, 122, DIG. 69; 425/80.1, 414, 416, 420, 422

[56] References Cited

U.S. PATENT DOCUMENTS

| | | | |
|---|---|---|---|
| 3,439,397 | 4/1969 | Marshak | 29/91 |
| 4,031,179 | 6/1977 | Tatzel | 264/517 |
| 4,568,581 | 2/1986 | Peoples, Jr. | 264/122 |
| 4,608,213 | 8/1986 | Kurumizawa et al. | 264/122 |
| 4,812,283 | 3/1989 | Farley et al. | 264/518 |
| 5,111,579 | 5/1992 | Andersen | 29/897.32 |
| 5,229,052 | 7/1993 | Billiu | 264/115 |
| 5,366,678 | 11/1994 | Nomizo et al. | 264/122 |
| 5,378,296 | 1/1995 | Vesa | 264/122 |
| 5,482,665 | 1/1996 | Gill | 264/113 |

*Primary Examiner*—Mary Lynn Theisen
*Attorney, Agent, or Firm*—Lawrence B. Plant

[57] ABSTRACT

Method and apparatus for quickly, and substantially uniformly, heating and cooling a bed of polymeric fibers having high melting point and low melting point fibers therein for softening the low melting point fibers and bonding them to the high melting point fibers to form a seat cushion. Hot and cool gases are flowed through the bed of fibers via a plurality of ventilator spikes extending into the fibers in the mold cavity to effect substantially uniform gas flow rates through the fibers for quick more uniform heating/cooling of the fibers.

9 Claims, 5 Drawing Sheets

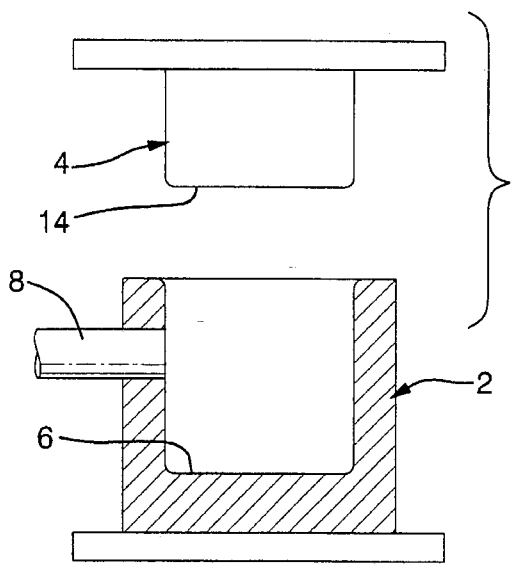
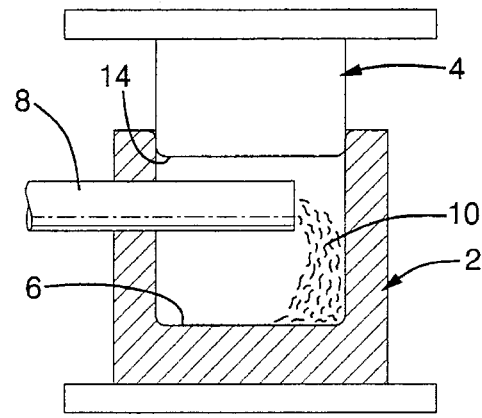
FIG. 1A   FIG. 1B
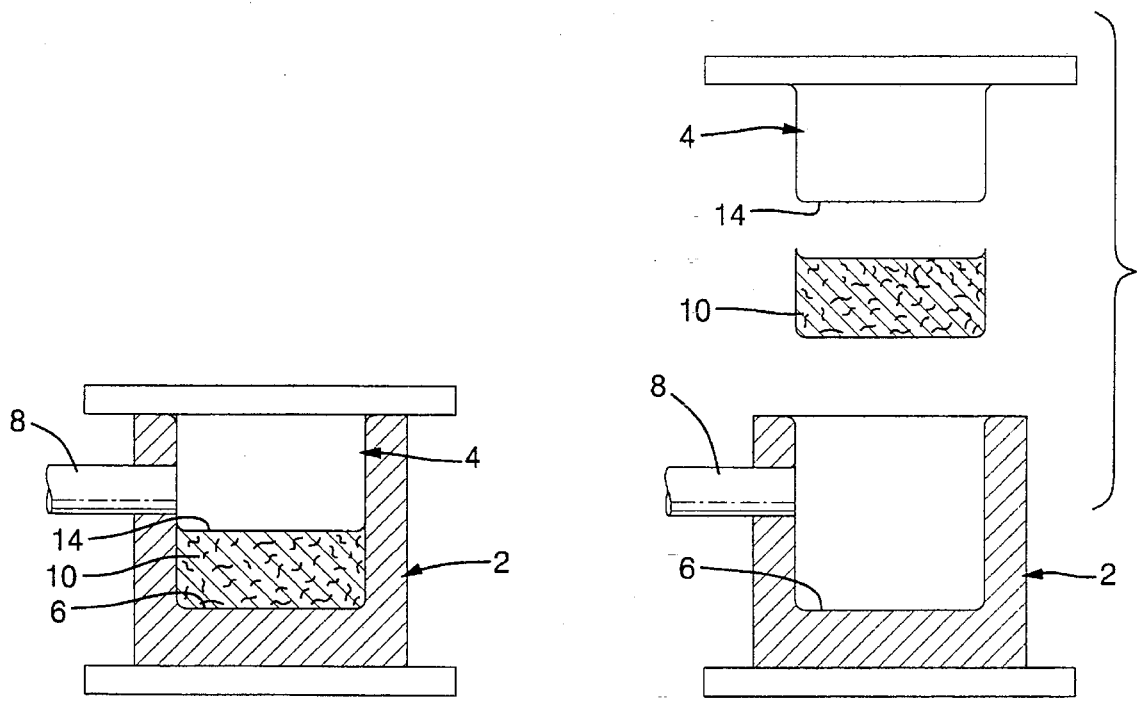
FIG. 1C   FIG. 1D

METHOD AND APPARATUS FOR MAKING FIBER-FILLED CUSHION

This invention relates to method and apparatus for making cushions having areas of different thickness by blowing a mixture of high and low melting polymeric fibers into a mold, shaping the fibers in the mold and flowing heated gas substantially uniformly through the mixture to fuse the low melting fibers to the high melting fibers.

BACKGROUND OF THE INVENTION

Fiber cushions (i.e., seats and backrests) are more durable, more breathable, less costly, and more readily recyclable than foam, and do not emit gases during processing. It is known to make fiber-filled cushions from a mixture of high melting point and low melting point fibers by heating the mixture in an oven so as no soften the low melting fibers (hereafter bonding fibers) and unite them with the high melting fibers (hereafter matrix fibers) at their points of intersection, and then cooling the mixture sufficiently to bond the bonding fibers to the matrix fibers.

Copending U.S. patent application No. 08/214,510 filed Mar. 18, 1994, now U.S. Pat. No. 5,482,665, in the name of P. Gill, and assigned to the assignee of the present invention describes a unique process and apparatus for heating and cooling a mixture of high and low melting fibers to make a cushion by passing hot and cool air, respectively, through the fiber mass. One of the shortcomings of the U.S. Ser. No. 214,510 process is that the time required to complete the heating-cooling cycle is determined by the time it takes to properly heat and cool the thickest or the densest sections of the cushion which have reduced air flow therethrough.

SUMMARY OF THE INVENTION

The present invention is an improvement on the method disclosed in U.S. Ser. No. 08/214,510, supra and focuses on a method and apparatus for flowing heating and/or cooling gas substantially uniformly through the fiber mass regardless of variations in thickness or density thereof. More specifically, the present invention comprehends a technique for making a porous, breathable, recyclable cushion having areas of varying thickness and/or density comprising piercing at least the thicker and/or denser areas of the cushion with perforated ventilator spikes which serve to cause the heating/cooling gases to pass more uniformly through the cushion. According to U.S. Ser. No. 08/214,510 supra which is herein intended to be incorporated by reference), the cushion is made from a mixture of polymeric matrix fibers having a first melting point and polymeric bonding fibers having a second melting point which is lower than that of the matrix fiber wherein the bonding fibers are heat-softened and unite with the matrix fibers so as to act like a binder holding the fibers together in a desired shape. The fiber mixture is blown through a plurality of injectors into a mold cavity having a shape conforming substantially to the desired shape of the cushion. The fibers are compressed in the mold cavity by a moveable portion of the mold, and heated gas (preferably air) passed therethrough for a time and at a temperature sufficient to soften and unite the lower melting bonding fibers to the higher melting matrix fibers at their points of intersection. Thereafter, cooling gas preferably air) is passed through the mixture for a time and at a temperature sufficient to bond the bonding and matrix fibers together such that the mixture retains the shape of the mold cavity.

In accordance with the present invention, the aforesaid process/apparatus is modified to include a plurality of ventilator spikes piercing the fiber mixture in the mold cavity. The ventilator spikes are perforated hollow tubes connected to a gas manifold for directing heating and/or cooling gas through the ventilator spikes into/out of the fiber mass, and serve to substantially equilibrate, or make uniform, the flow rate of the gas through the fiber mixture in the mold cavity. The density and distribution of the ventilator spikes will depend on the shape and composition of the cushion with a higher concentration of the spikes being provided for the thicker and/or denser regions of the cushion. In accordance with a preferred embodiment of the invention, the ventilator spikes will be attached to a gas manifold and move through, and independently of, the moveable portion of the mold. The spikes may be used to direct the hot and/or cool gas into or out of the mold cavity depending on the direction of gas flow through the mold cavity.

The invention will be better understood when considered in the light of the following detailed description of certain specific embodiments thereof which is given hereafter in conjunction with the several drawings in which:

DESCRIPTION OF THE DRAWINGS

FIGS. 1A–1D schematically depict the several steps of the basic process (sans the present invention);

DETAILED DESCRIPTION OF THE INVENTION

Figure 2:
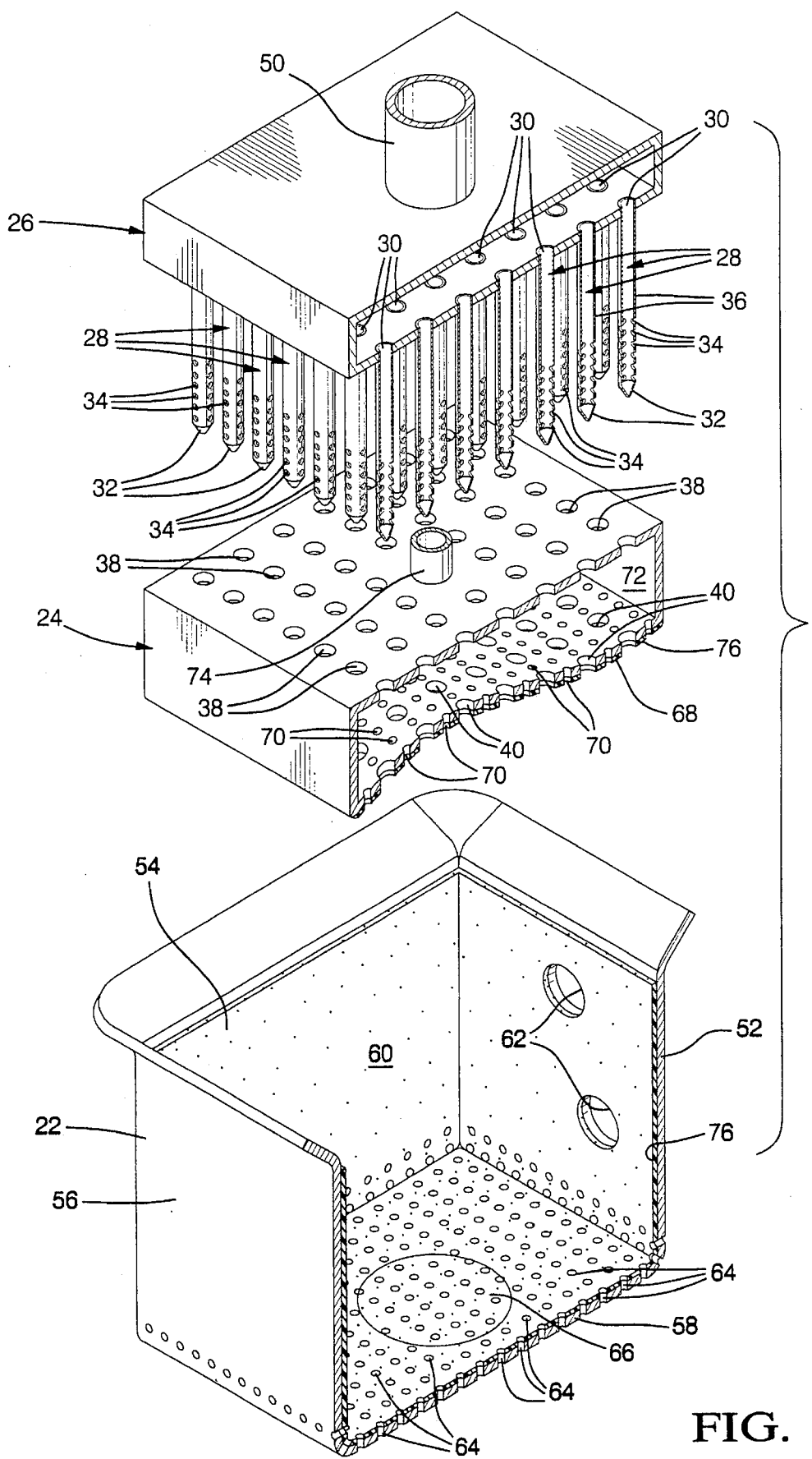
FIG. 2 is a sectioned, exploded, perspective view of the male and female mold members, and the ventilator spikes in accordance with the present invention.

The fiber mix used to make cushions in accordance with the present invention will typically comprise about 25 percent to about 30 percent by volume bonding fibers, but more or less may be used. Preferably, the bonding fibers will have a melting point at least about 60° C. lower than the melting point of the matrix fibers such that substantially only the bonding fibers will soften during the heating step. Most preferably, the melting point differential between the matrix and bonding fibers will be about 70° C.–80° C. Preferably, the melting point of the matrix fibers will be at least about 250° C., and the melting point of the bonding fibers between about 150° C. and about 210° C. In accordance with a most preferred embodiment of the invention, the melting point of the matrix fibers will be at least about 260° C., and the melting point of the bonding fibers will be about 180° C. or more depending on the melting point of the matrix fibers. The fibers will comprise any of a variety of natural or synthetic polymeric materials known to be useful for such applications including polyethylene, polypropylene, polyamide, aramides and polyesters. Commercially available synthetic fibers useful with the present invention include, for example:

1. Polypropylene fibers sold by the Fibres South Co. of Trussville, Ala., under the trade name Poly-Star®;
2. Polyethylene and Polypropylene fibers sold by the Hercules Co. of Norcross, Ga.;
3. Polyethylene Terephthalate fibers sold by the Hoechst Celanese Co. of Charlotte, N.C., under the trade names Trevira and Celbond;

4. Polyamide, aramide and polyethylene terephthalate fibers sold by the EI dupont deNemours Co., under the trade names Nylon, Nomex/Kevlar and Dacron, respectively; and 5. Polyethylene terephthalate fibers sold by the Eastman Chemical Products Co. under the trade name Kodel. Preferably, the fibers will comprise a mixture of high and low melting species of polyethylene terephthalate (hereinafter (PET), because such fibers have better durability, compression recovery and are readily recyclable. Compressed, PET mixtures will have bulk density of about 1.75 lbs./ft.$^3$ to about 2.5 lbs./ft$^3$ which represents about 2 percent to about 3 percent by volume fibers and the remaining voids (i.e., about 97 percent–98 percent porous).

While for simplicity and recyclability, the bonding fibers will preferably comprise the same type of polymer (e.g., all polyesters) as the matrix fibers, the bonding fibers may comprise a different polymer than the matrix fibers. Hence, for example, polyester matrix fibers may be admixed with polypropylene bonding fibers.

The matrix fibers will vary in length from about 1¼ inches to about 1½ inches, vary in diameter from about 15 denier to about 25 denier, and comprise about 70 percent to about 75 percent by volume of the fiber mixture. Similarly, the bonding fibers will vary in length from about 1¼ inches to about 1½ inches, vary in diameter from about 6 denier to about 9 denier, and comprise about 25 percent to about 30 percent by volume of the fiber mixture.

Cushions are made by blowing the fibers into a porous mold having a moveable member, compressing the fibers in the mold with the member, heating the fibers with hot air passed therethrough and then cooling the fibers with cool air passed therethrough as described in U.S. Ser. No. 08/214,510. The process is readily controllable by simply monitoring the temperature of the heating/cooling gases at different sites in the system. In this regard, the temperature of the gas is measured just before it enters the fiber mixture and again just as it exits the fiber mixture. When the temperature of the exiting gas approaches the temperature of the entering gas, heating is discontinued and cooling gas admitted to the mixture. Thereafter, when the temperature of the cooling gas exiting the mixture approaches the temperature of the cooling gas entering the mixture, the cooling gas is discontinued, the mold opened and the cushion ejected. Preferably, the temperature and flow rate of the heating gas is selected so as to soften the bonding fibers in less than five minutes into the heating cycle.

Preferred apparatus for carrying out the aforesaid process includes a female mold member comprising a plurality of walls defining a mold cavity, at least one of which walls (preferably the bottom wall) is gas permeable. A male mold member, nestable within the mold cavity, is adapted for reciprocal movement into and out of the mold cavity for compressing the fiber mixture therein, and serves to shape the outer surface of the cushion. The male mold member has another gas-permeable wall positioned opposite the gas-permeable wall in the female mold member. A gas plenum system surrounds the gas-permeable walls and the ventilator spikes of the present invention for providing gases (e.g., air) to the mold cavity for heating and cooling the mixture therein. A source of pressurized gas (e.g., a blower) communicates with the plenum system for pumping gas through the gas-permeable walls, the ventilator spikes, and the mixture of fibers in the mold cavity. A heater communicates with the blower for heating the gas to a temperature sufficient to soften the low melting point bonding fibers in the mix. The direction of flow in the plenum system may be reversed such that either the plenum associated with the female mold portion, male mold portion or the ventilator spikes distributes the heating/cooling gases into the fiber mass, or it may receive the gas from the fiber mass and exhaust it from the mold cavity.

For filling, a plurality of injectors (preferably four) enter the mold cavity through openings in one of the side walls of the mold for dispensing the mixture of fibers into the cavity from a remote source thereof connected to the other end of the injector. Most preferably, the injectors pass through openings in the side of the mold cavity to deliver the fiber mixture thereto and then retract out of the cavity to permit the male mold member to move unimpeded into and out of the cavity during its compression and retreat cycle. An appropriate drive mechanism (e.g., preferably a ball and screw device) engages the injectors for effecting the movement of the injector into and out of the cavity. Alternatively, hydraulic/pneumatic cylinders or rack and pinion devices could be used for this purpose. The drive mechanism will initially extend the injectors well into the mold cavity (i.e., almost to the wall of the cavity opposite the wall having the hole through which the injector enters the cavity). After the fiber begins to flow from the injectors into the cavity, the injector is slowly retracted from its initial extended position so as to deposit a substantially uniform layer of fibers onto the floor of the mold cavity. A blower (not shown) coupled to the plenum associated with the male mold member causes a current of downwardly flowing air to pack the fibers into the bottom of the mold cavity. The fibers will preferably be fed into the injectors by means of jets of gas (i.e., air) flowing into the other end of the injector so as to create a vacuum and draw airborne fibers into the injector from a source of such fibers. In accordance with copending U.S. patent application Ser. No. 08/573,771 (Attorney Docket No. H-186290) filed concurrently herewith, higher gas pressures and flow rates may be used in some of the injectors than in others to draw more fibers into the injectors under high gas pressure per unit of time and deposit such fibers in select zones of the mold cavity. Hence for making a cushion having a relatively low density central portion flanked by lateral bolster portions of higher density, the outermost injectors feeding the bolster-forming zones of the mold cavity will have higher pressure air fed thereto than the inboard injector feeding the central zone of the mold cavity.

A stripper plate engages the cushion in the cavity for ejecting the cushion from the cavity after the cushion has cooled sufficiently for the cushion to retain the desired shape. The stripper plate forms a part of one of the walls of the mold cavity (preferably the gas-permeable wall) and serves to eject the cushion from the mold cavity upon completion of the heating/cooling cycle. The surfaces of the mold cavity and the male mold member which contact the fibers are preferably coated with a fluorocarbon (e.g., polytetrafluoroethylene, or the like) to prevent the heated fibers from adhering to such surfaces. Temperature sensors (e.g., thermocouples) are provided in the gas plenums adjacent the gas-permeable walls to measure the gas temperature thereat and provide appropriate signals for controlling the process.

FIGS. 1A–1D illustrate the basic process which is the subject of U.S. Ser. No. 08/214,510, supra (sans the present invention). In FIG. 1A, the female mold member 2, and male mold member 4 are in the open position before fibers are introduced into the cavity 6 from the injector 8. FIG. 1B depicts the beginning of the process wherein the male mold member 4 is in the semi-closed position with respect to the female mold member 2 and the injector 8 extends well into the cavity 6 to dispense the fibers 10 therein. FIG. 1C depicts the injector 8 in the retracted position, and the male mold member 4 fully inserted into the female mold member 2 to compress the fibers 10 in the mold cavity 6. In this position, heated gas is blown through the fiber mix 10 to soften the low temperature bonding fibers and unite them to the high temperature matrix fibers. Thereafter, cool air is blown through the fiber mix 10 to solidify the low melting fibers and bond them to the high melting fibers. Finally, FIG. 1D shows the male member 4 in a fully opened position, and the cushion formed by the fiber mixture 10 and 18 ejected from the mold.

FIG. 2 illustrates a female mold member 22, male mold member 24, and gas manifold 26 in the mold-open position. The gas manifold 26 includes a plurality of tubular ventilator spikes 28 each having an open end 30 and a closed end 32. A plurality of apertures 34 extend through the walls 36 of the spikes 28 proximate the closed end 32. A number of openings 38 and 40 in registry with the spikes 28 are provided through the male mold portion 24 for movement of the spikes 28 therethrough (see FIG. 4). A pipe 50 carries the manifold/plenum 26 and is moved up and down by a suitable motor, hydraulic cylinder, or the like (not shown). Gas enters or exits the manifold/plenum 26 via the pipe 50, as appropriate to the direction of gas flow in the system. The female mold member 22 comprises a plurality of walls 52, 54, 56 and 58 defining a mold cavity 60. A plurality of openings 62 are provided in the side wall 52 to receive a plurality of injectors 64 (see FIG. 4—only one shown) from the filling machine, as will be described in more detail hereinafter. The bottom wall 58 of the mold 22 comprises a plurality of apertures 64 so as to render the bottom wall 58 permeable to gas. The centermost portion 66 of the wall 58 serves as a stripper plate for ejecting the cushion from the mold cavity 60 at the end of the processing cycle as will be described in more detail hereinafter. The male mold member 24 comprises a lower wall 68 for shaping the upper surface of the cushion and has a plurality of apertures 70 therein for rendering the wall 68 gas permeable. The gas-permeable wall 68 is backed up by a plenum 72 which, in turn, is connected to a conduit 74 which passes through the pipe 50 for exhausting (or providing as appropriate) heating and cooling gases from (or to) the plenum 72. The permeable wall 68 of the male mold member 24 is contoured to shape the outer surface of the cushion.

Figure 3:
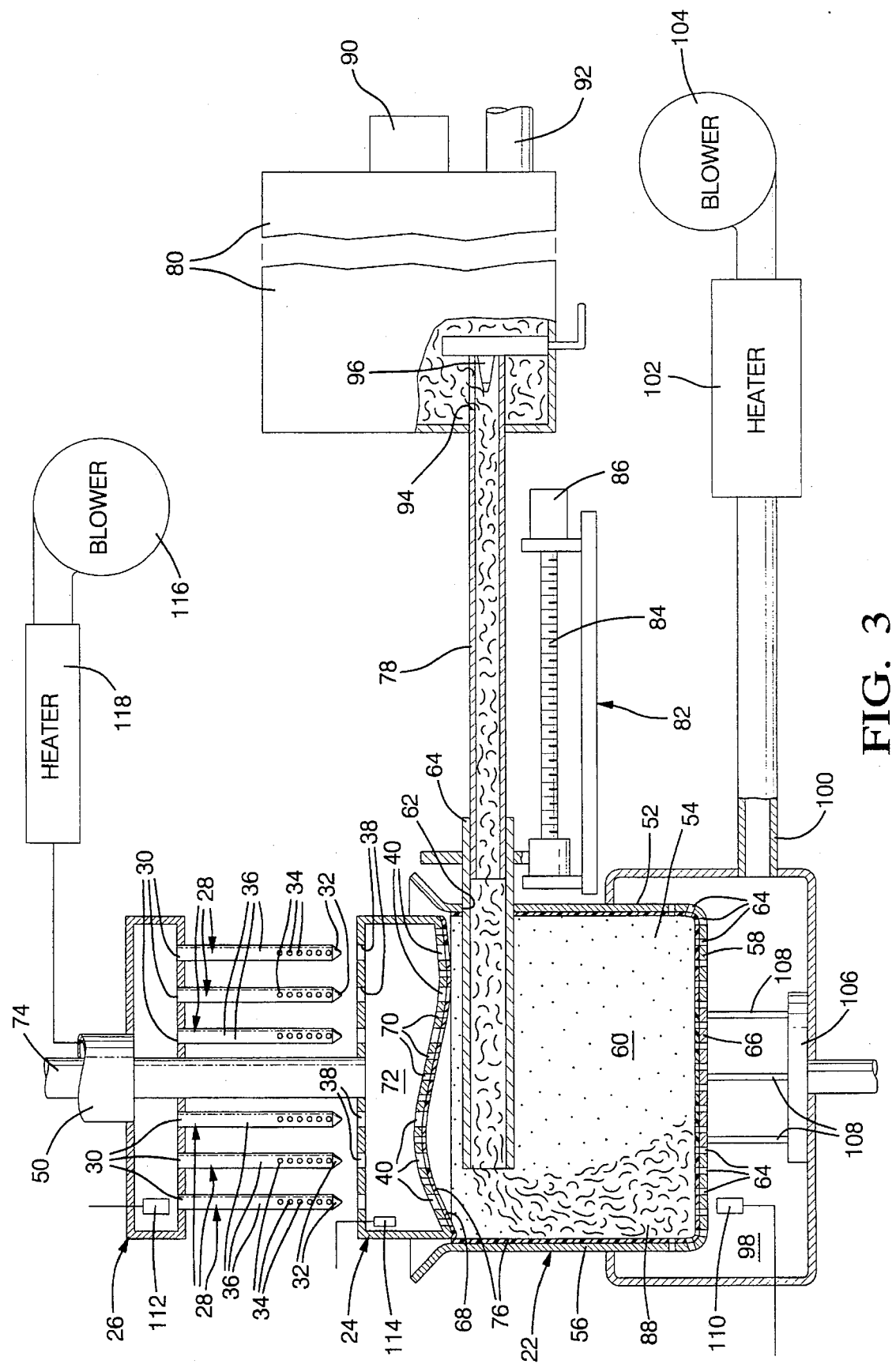
FIGS. 3–5 are partially sectioned, side views of the apparatus of the present invention at different stages in the process.
Figure 4:
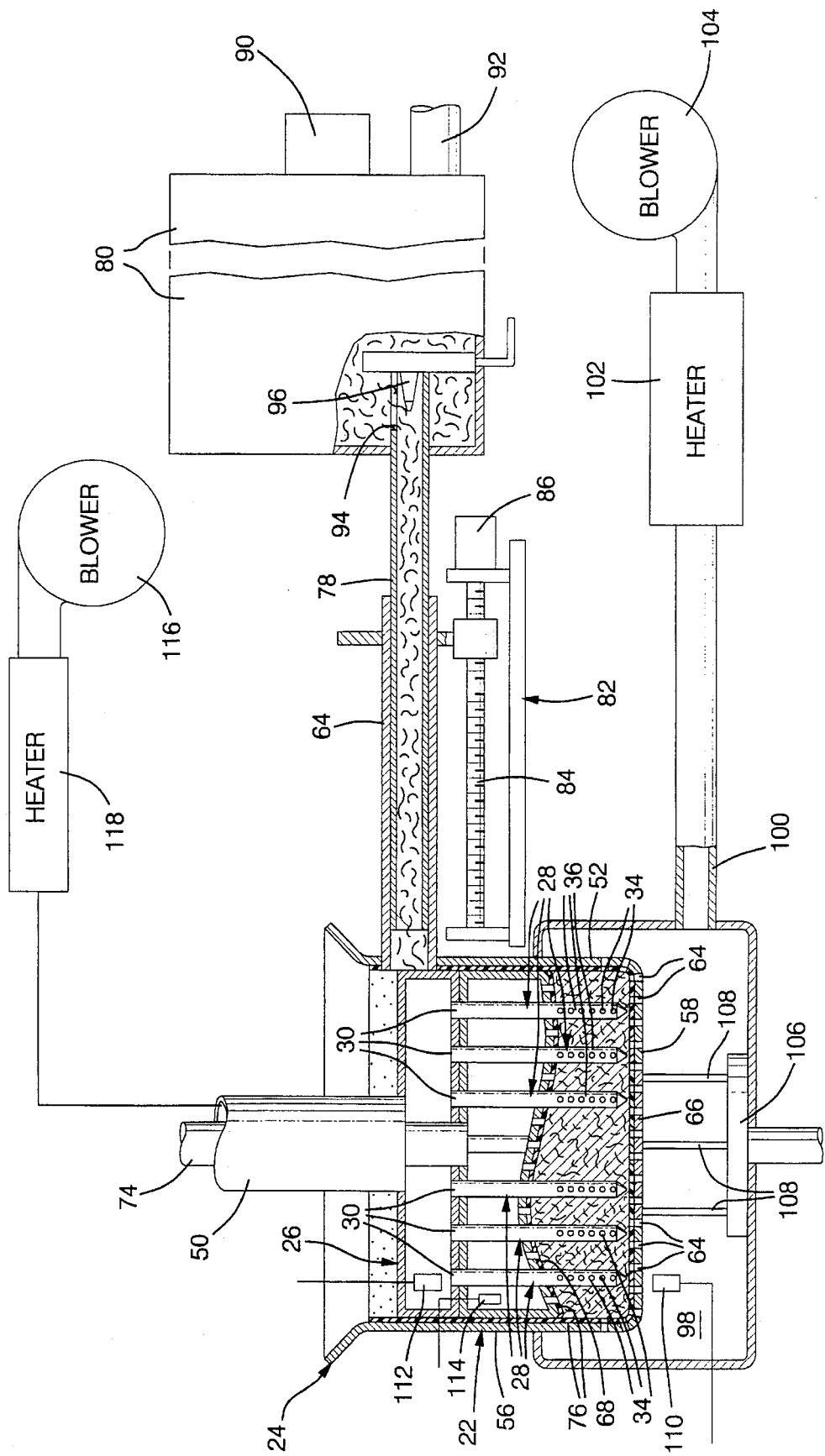
Figure 5:
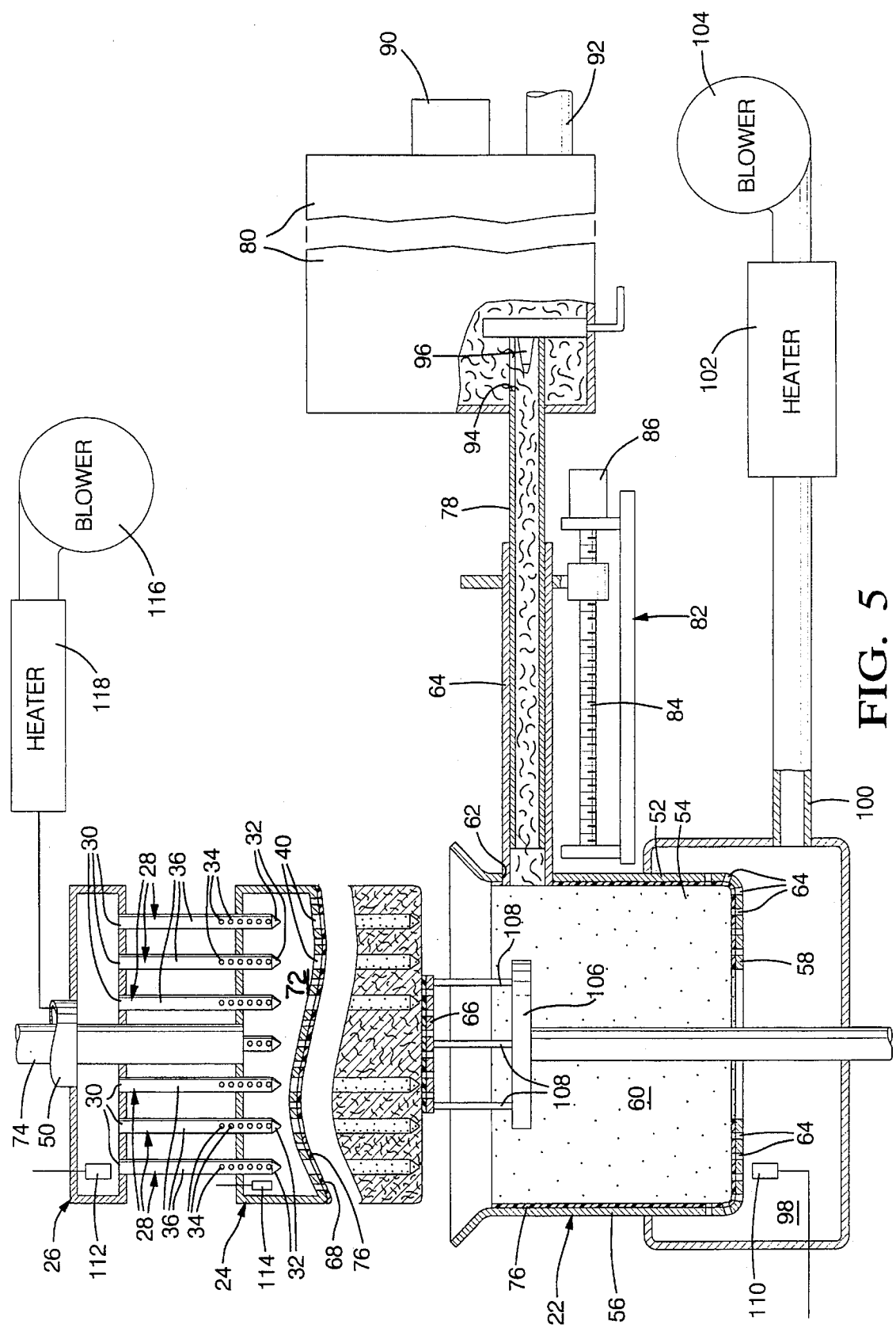

FIGS. 3–5 depict apparatus for making cushions according to the process described above with different components of the apparatus in different positions at various times in the cycle. FIG. 3 shows the apparatus essentially at the beginning of the process with the male mold member 24 in a semi-closed position at the mouth of the cavity 60 in the female mold member 22. The injectors 64 (only one shown) extend through the openings 62 to almost the other side of the mold cavity 60 which is itself, along with the wall 68, coated with a Teflon layer 76. Each injector 64 fits in telescoping fashion over a three inch diameter stationary feed tube 78 extending from the filling machine 80, and is caused to move fore and aft by a drive mechanism 82 which is preferably a ball and screw type linear actuator 84 powered by reversible motor 86. Alternative drive mechanisms include pneumatic/hydraulic cylinders, rack and pinion gears, or the like (not shown). The injectors 64 move slowly from the fully extended position shown in FIG. 3 to the retracted position shown in FIG. 4 as they dispense the fibers 88 into the mold cavity 60 so as to provide a substantially even distribution of the fibers in the cavity 60. At the same time, the plenum 72 in the upper mold member 24 is pressurized with air so as to provide a current of downwardly moving air which serves to help distribute the fibers evenly while packing them in the bottom of the mold cavity 60.

The filling tubes 78 are connected to the filling machine 80 which is essentially a commercially available machine marketed for filling pillows with fibers and sold by the Ormont Corporation as their Model No. TRP11 Commander filling machine. That machine essentially includes a motor 90 for driving a plurality of impellers or blades (not shown) inside the machine 80 for keeping the fibers stirred up and airborne in the machine 80. A conduit 92 delivers the fibers to the machine 80 from a remote source thereof (not shown). The end of each filling tube 78 inside the filling machine 80 is open at the top 94 for admitting the airborne fibers to the tubes 78. Nozzles 96 emit a jet of air into their associated filling tubes 78, which draw fibers into the tubes 78 through the openings 94 and convey them down the tubes 78 through the injectors 64 into the mold cavity 60. The air pressure and volume provided by one nozzle 96 to its associated tube 78 may be higher than the air pressure and volume provided by another nozzle to its associated tube where different densities of fibers on the mold are sought.

The bottom wall 58 of the mold 22 includes a plurality of apertures 64 so as to render the bottom wall permeable to gases. Similarly, the bottom wall 68 of the male mold member 24 contains a plurality of perforations 70 for the same reason. The bottom of the female mold 22, and hence the gas-permeable wall 58, is encompassed by a plenum 98 which is connected to a conduit for supplying or removing the gases from the plenum 98 as needed. A heater 102 is coupled to the conduit 100 and to a blower 104 for heating air passing through the conduit 100 when the blower 104 is energized to pressurize the plenum 98.

A stripper plate 66 forms part of the perforated wall 58 and is connected to an elevator 106 by means of rods 108 for ejecting the cushion from the mold cavity 60 upon completion of the heating/cooling cycle. Temperature sensors 110 and 112 (e.g., thermocouples) are provided in the plenums 99 and 26 for sensing the temperature of the gas at those locations and sending suitable signals to appropriate controllers (not shown) for controlling/automating the process. Sensor 114 may be positioned in plenum 72 depending on how the gas is directed through the system. Hence if the gas is exhausted through the plenum 72 rather than the manifold/plenum 26, the sensor 114 would be located in the plenum 72.

FIG. 4 is like FIG. 3 except that it shows the (1) ventilator spikes 28 passing through the openings 38 in the male mold member 24 and piercing the fiber mixture 88 in the mold cavity 60, (2) injectors 64 in the fully retracted positions along the tubes 78, and (3) the male mold member 24 fully seated in the female mold 22 compressing the fiber mixture 88 to the desired shape. This position is retained during the heating and cooling cycle which begins by the blower 104 pumping gas (i.e., air) through the heater 102 into the conduit 100 and plenum 98, through the gas-permeable wall 58 and the fiber bed 88, and finally exhausting the gas from the bed 88 out the pipe/duct 74 via the gas-permeable wall 68 and plenum 72. Hot air flow continues until the temperature sensed at the sensor 114 approaches that sensed at the sensor 110 which is indicative of the fact that the fibers 88 are substantially uniformly heated throughout and can absorb substantially no additional heat. Concurrently, hot gas is blown by blower 116 through heater 118 and pipe 50 into manifold/plenum 26 and thence into the fibers 88 via the apertures 34 in the ventilator spikes 28. While the drawings show a uniform distribution of the spikes 28, in reality they will preferably be appropriately positioned so as to pierce only the thicker/denser areas of the fibers 88 in order to achieve a substantially uniform flow of heating/cooling gas through the fibers 88 such that all of the fibers, regardless of their location within the cushion, will heat/cool at the same rate, which is quicker than if no such ventilator tubes existed. When sensors 110, 112 and 114 read the same, the heaters 102 and 118 are shut off, and ambient or cool air is pumped into the plenums 98 and 26 through the fiber mixture 88 and out the plenum 22 to cool and bond the low melting point fibers to the high melting point fibers at the intersections thereof. Cooling continues until the temperature at sensor 114 drops to approximately the temperature sensed at sensors 110 and 112 which is indicative that the fibers 88 have cooled sufficiently as not to give off any additional heat, and accordingly have bonded the low melting point fibers to the high melting point fibers sufficient for the cushion to retain the shape provided during the compression step.

Finally, and as shown in FIG. 5, after the fibers 88 have cooled sufficiently to fix the shape of the cushion, the male mold member 24 and manifold 26 are retracted to the fully opened position and the stripper plate 66 lifted, via the elevator 106, to eject the cushion from the female mold 22. After the cushion is removed, the elevator 106 descends until the stripper plate 66 repositions itself with the wall 58, and the cycle begun again.

Alternatively, hot/cool air may be blown only through the ventilator spikes 28 and exhaust from the fibers 88 via the plenums 72 and 98. Moreover in still another alternative, hot/cool air may be blown into the fibers 88 from plenum 98 and exhaust from the fibers 88 via the ventilator spikes 28. Hence the direction of gas flow is not the important consideration. Rather what is important is that the fibers be so ventilated in the thicker/denser regions thereof that the distances the gas must flow through the fibers be substantially uniform for substantially uniform heating/cooling, and short for quick heating/cooling.

While the invention has been disclosed in terms of certain specific embodiments thereof, it is not intended to be limited thereto, but rather only to the extent set forth hereafter in the claims which follow.

What is claimed is:

1. A method of molding a porous, breathable seat cushion having areas of varying thickness and/or density comprising the steps of:
    a. dispensing a mixture of a polymeric matrix fiber having a first melting point and a polymeric bonding fiber having a second melting point lower than said first melting point into a mold having a cavity conforming substantially to the desired shape of said cushion;
    b. closing said mold so as to compress said fibers in said mold cavity to a desired density;
    c. piercing said mixture in said mold with a plurality of hollow, perforated ventilator spikes;
    d. passing a heated gas through said ventilator spikes and said mixture for a time and at a temperature sufficient to soften said bonding fibers and unite them with said matrix fibers at their points of intersection;
    e. passing a cooling gas through said mixture for a time and at a temperature sufficient to bond said bonding fibers to said matrix fibers such that said mixture retains said shape after said mold is opened; and
    f. removing said cushion from said cavity.

2. A method according to claim 1 including passing said cooling gas through said ventilator spikes in step e.

3. A method according to claim 1 wherein the melting point of said matrix fiber is at least about 250° C., and the melting point of said bonding fiber is about 150° C. to about 210° C.

4. Apparatus for molding and bonding a mixture of relatively high-melting point polymeric matrix fibers and relatively low-melting point polymeric bonding fibers together into a compressible, breathable cushion comprising:
    a. a female mold member comprising a plurality of walls defining a mold cavity, at least one of said walls being gas-permeable;
    b. at least one injector for dispensing said mixture into said cavity;
    c. a source of said mixture connected to said injector for supplying said mixture to said injector;
    d. a male mold member adapted for reciprocal movement into and out of said mold cavity for compressing said mixture in said cavity, said male mold member having a gas-permeable wall for shaping said cushion in said cavity;
    e. a plurality of ventilator spikes moveable into and out of said mold cavity, said ventilator spikes each comprising a tube having a first open end, a second closed end adapted to pierce said mixture in said cavity, and a plurality of apertures in said tube proximate said second end;
    f. a gas plenum system contiguous said gas-permeable walls and said open ends of said ventilator spikes for providing gas to said mold cavity via said spikes for heating and/or cooling said mixture in said cavity;
    g. a first blower communicating with said plenum system for moving said gas through said system and said mixture; and
    h. a heater for heating said gas in said system to a temperature sufficient to soften said low-melting fibers and unite them to said high-melting fibers.

5. Apparatus according to claim 4 wherein said spikes are integral with said male mold member.

6. Apparatus according to claim 4 wherein said open end of said spikes communicate with a gas-flow manifold which is a component of said plenum system separate from said male mold member.

7. Apparatus according to claim 6 including means for moving said spikes into and out of said cavity.

8. Apparatus according to claim 6 wherein said male mold member includes a plurality of openings through which said ventilator spikes pass to pierce said mixture in said mold cavity.

9. Apparatus according to claim 6 including a second blower communicating with said manifold for pumping said gas through said ventilator spikes and said mixture independently of said first blower.

* * * * *